3,004,067
SEPARATION OF AROMATIC
CARBOXYLIC ACIDS
Gordon Howard Whitfield and Edward Kemp, Norton-on-Tees, England, assignors to Imperial Chemical Industries Limited, London, England, a corporation of Great Britain
No Drawing. Filed Nov. 25, 1957, Ser. No. 698,397
Claims priority, application Great Britain June 21, 1957
2 Claims. (Cl. 260—525)

This invention relates to the separation and/or purification of aromatic carboxylic acids.

A process has already been devised for the production of ortho-phthalic acid which comprises: oxidising xylene containing ortho-xylene and at least one other xylene in the liquid phase by means of a gaseous oxidising agent selected from the group consisting of molecular oxygen and ozone in the presence as solvent of an aromatic carboxylic acid and as catalyst of the bromide of at least one metal of variable valence; subjecting the mixture to conditions which decrease the partial pressure of water over the liquid whereby ortho-phthalic anhydride is formed and remains in solution in the liquid; removing substantially all the insoluble phthalic acid selected from iso- and tere-phthalic acid; subjecting the residual solution to hydrolysis in the liquid phase with at least the stoichiometric proportion of water; and separating ortho-phthalic acid from the liquid reaction medium.

Another process has already been devised for oxidising aromatic hydrocarbons or their closely related oxygenated derivatives, substituted by at least two autoxidisable groups, to aromatic carboxylic acids preferably in the presence of a solvent by means of molecular oxygen or ozone in the presence as catalyst of at least one halide of a metal of variable valence, especially the bromide; subjecting the reaction mixture to conditions which decrease the partial pressure of water over the liquid whereby an acid anhydride is formed and remains in solution in the liquid; filtering off insoluble acid or acids; subjecting the residual solution to hydrolysis in the liquid phase with at least the stoichiometric proportion of water whereby the said anhydride is hydrolysed to the corresponding acid which is precipitated; and separating off the insoluble acid from the liquid medium. Particularly suitable starting materials for that process are the halomethylation products of toluene, for example monochloro- or monobromo-methyl toluene.

We have now found that any given mixture of phthalic acids containing ortho-phthalic acid or anhydride, independently of the method used for its production, can be treated in the manner described below for the recovery of iso- and/or tere-phthalic acids substantially free from ortho-phthalic acid or anhydride, and/or the recovery of ortho-phthalic acid substantially free from the other two acids.

According to the present invention a mixture of phthalic acids containing ortho-phthalic acid or anhydride is subjected in the presence of a suitable solvent, to dehydrating conditions, whereby ortho-phthalic anhydride is formed, and goes into solution in the solvent, the insoluble iso- and/or tere-phthalic acids are removed, the mother liquor is subjected to hydrolysis in the presence of at least the stoichiometric proportion of water, whereby ortho-phthalic acid is formed and the ortho-phthalic acid is separated from the liquid. According to the invention it is also possible to isolate ortho-phthalic acid substantially free from tere- or iso-phthalic acid, or the obtain tere- or iso-phthalic acid or their mixtures substantially free from ortho-phthalic acid.

The mixture containing the ortho-phthalic anhydride and/or ortho-phthalic acid may originate in various ways. Thus it may, for example, have been produced by the oxidation of starting material containing a compound having two autoxidisable groups in the ortho-position, for example benzene substituted in the ortho-position with groups selected from

where R and R'=H or alkyl, and

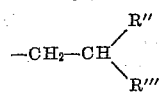

where R" and R'''=H, alkyl, or aryl, or any closely related oxygenated derivative of any such compounds, for example those in which the functional groups are selected from —CH, —CH$_2$OR$_1$ (R$_1$=H, alkyl, acyl, or aroyl, —COCH$_3$, hydroperoxy. The oxidation may have been effected, for example, by means of a gaseous agent comprising oxygen or ozone in the presence of an oxidation catalyst, for example manganese, cobalt, lead, cerium or their salts or compounds, for example, naphthenates, carboxylates; or other oxidising agents such as nitric acid may have been used.

The process of the invention may also be applied to the product of the vapour phase oxidation of naphthalene.

Dehydration is effected by continuously withdrawing the vapour above the reaction mixture whereby ortho-phthalic acid present in the mixture is converted to ortho-phthalic anhydride which remains in solution. Dehydration can be effected with the aid of heat in a number of ways; for example by distilling off water formed in the reaction, conveniently under reflux; or by flash distillation; or by evaporation; or by passing gas, especially an inert gas, through the liquid; or by a combination of these methods. Moreover the operation may be conducted at atmospheric, superatmospheric or subatmospheric pressure.

The dehydration of the ortho-phthalic acid to anhydride may be effected in the reactor in which the oxidation is conducted, or applied to the oxidation product in a separate vessel, by lowering the aqueous vapour pressure over the liquid as already described. Suitable apparatus comprises, for example, a reactor with heating means, fitted with a condenser and a separator such as a decanter for removing water, and may include also a distillation column. Suitable temperatures for the step are for example 100° to 300° C.

The insoluble acids or other compounds can be removed from the liquid by filtering or centrifuging.

The hydrolysis step is effected in a solvent using an amount of water at least stoichiometrically equivalent to the ortho-phthalic anhydride in the mixture. Below 100° C. hydrolysis is slow and therefore temperatures within the range 100° to 300° C., more preferably not above 250° C., are preferred. A wide range of pressure can be used so long as the mixture is maintained in the liquid phase. Suitable apparatus for the hydrolysis step comprises a reactor provided with heating means, and with a reflux condenser and stirring means. The mixture is cooled to, for example 200° C., or below before filtering or centrifuging.

Most frequently a solvent will have been used in the oxidation process by which the ortho-phthalic anhydride or acid has been produced. It is an advantage both in simplicity and economy, if this solvent is also suitable for use in the process of the present invention. Suitable solvents are those in which ortho-phthalic anhydride is soluble and the isomeric acids are substantially insoluble, and which under the hydrolysis conditions have at least some miscibility with water. Preferably the solvent either forms azeotropes with the water formed in the oxidation, for example benzene, or boils at a temperature higher than water, for example benzoic acid or chlorobenzene, so that the water can be removed and thus phthalic anhydride formed instead of phthalic acid.

Suitable solvents for use both in the dehydration step and the hydrolysis step are: benzoic acid; ortho-, meta- and para-toluic acids and mixtures thereof, for example the partial oxidation products of pure or mixed xylene isomers; alkyl aromatic carboxylic acids or mixtures thereof, for example ortho-, meta- or para-ethyl or isopropyl benzoic acids, dimethyl benzoic acids; benzene (which requires the use of pressure) and alkylated benzenes, for example toluene, ethylbenzene (with both of which pressure is desirable), or their chloro- or dichloro-derivatives, for example chlorbenzene, xylylchlorides, or xylylene chlorides; nitro-aromatic or nitro-alkyl aromatic compounds, for example nitrobenzene; aliphatic mono-carboxylic acids such as propionic (with the lower members it is desirable to use pressure); higher aliphatic ketones (the use of pressure may be desirable); higher boiling ethers such as dioxan (the use of pressure may be desirable).

Solvents suitable for use in the hydrolysis step only are lower aliphatic ketones, for example acetone, and esters, for example ethyl acetate.

Mixtures of polar and non-polar solvents are advantageous for example of benzene or ortho-dichlorbenzene with an aliphatic acid.

Feedstock used in the prior oxidation step or partial oxidation products of the said feedstock have especial advantage for use as solvents in the present process, provided they satisfy the necessary criteria. When the same solvent is used both in the antecedent oxidation and in the present process the following solvents are preferred because they are resistant to oxidation: benzene, halobenzenes, nitrobenzene, benzoic acid, and aliphatic carboxylic acids, and mixtures thereof.

The insoluble ortho-phthalic acid resulting from the hydrolysis, after cooling is necessary, is separated for example by filtering or centrifuging, and can be obtained in substantially pure form by washing with any of the aforesaid solvents, and then with a low boiling solvent such as 40° to 60° C. petroleum ether.

The proportion of solvent used may vary with the solvent, but should be kept low enough to ensure that as much ortho-phthalic acid as possible is precipitated in the second stage. The solvent may be recovered by distillation from the mother liquor and recycled.

In continuous operation it is preferred to use the same solvent both in the dehydration step and in the hydrolysis, with the aid of superatmospheric pressure if necessary. One suitable method of operation is as follows. Make-up and recycled solvent, together with mixed acids, which may include recycled material, are fed continuously to the dehydration vessel, water vapour is continuously removed therefrom, magma comprising mixed acids, orthophthalic anhydride and solvent is continuously withdrawn and fed to a centrifuge, mixed iso- and tere-phthalic acids are thus isolated and may be washed with the same solvent, the mother liquor, and washings if desired, are then passed continuously to a second vessel together with at least the stoichiometric proportion of water for hydrolysis of ortho-phthalic anhydride to o-phthalic acid, which precipitates, magma is continuously withdrawn to a centrifuge, and the ortho-phthalic acid is separated and may be washed on the centrifuge with the same solvent. The crude ortho-phthalic acid may be purified by washing further with a light boiling solvent, for example, petroleum ether. The mother liquor from the centrifuge is freed from water, either by decantation or by azeotropic distillation, depending on the solvent, the solvent is then distilled off, and recycled to the dehydration step, and the residual mixture of acids may be worked up for recovery of the individual components, or may be recycled to the antecedent oxidation process.

In recovering the solvent it is desirable, in order to remove contaminants therefrom, to fractionate it carefully during each cycle or at periodic intervals. Alternatively to keep down the amount of contaminants some of the solvent may be purged from the system.

If desired the solvent recovered from the mother liquor may be recycled to the hydrolysis reactor. This applies especially where the solvent is only suitable for use in the hydrolysis step.

Sometimes if desired, part of the mother liquor which has been freed from water and comprises solvent plus dissolved acids is recycled to the dehydration vessel.

According to a variant of the invention ortho-phthalic acid containing minor amounts of tere- and/or iso-phthalic acids is purified by suspending it in the solvent, the whole is heated and the aqueous vapour pressure over the liquid is decreased to form ortho-phthalic anhydride by dehydration, the insoluble material is filtered off, and orthophthalic acid is obtained hydrolysing the filtrate with water, filtering off and washing with solvent.

Alternatively the mixture may be heated to produce ortho-phthalic anhydride, the whole may be treated with solvent whereby ortho-phthalic anhydride dissolves, the insoluble material is filtered off and ortho-phthalic acid is obtained by hydrolysing the filtrate with water, and separated by filtering.

Ortho-phthalic acid separated according to the invention is a valuable raw material for the production of phthalic anhydride. For this purpose the ortho-phthalic acid is heated to at least 190° C., and the melt is kept in this range of temperature until all the water has been lost. The residual crude anhydride is distilled or sublimed, preferably under reduced pressure. An improved product substantially free from unsaturated contaminants, such as quinones and maleic anhydride can be produced by conducting the distillation or sublimation in the presence of sulphuric acid.

*Example 1*

10 grams of terephthalic and 11.2 grams of ortho-phthalic acid was heated at 210° C. for 1 hour and there was obtained 20 grams of solid, 1.2 grams of water having been expelled. This solid was heated at 130° C. under reflux with 40 grams of nitrobenzene for 30 minutes, the crude terephthalic acid was filtered off, and after being washed with acetone yielded 10.0 grams of 99% pure terephthalic acid, corresponding to a 99% molar yield.

The filtrate was combined with the residue obtained by evaporating off the acetone from the above washings, and the mixture was refluxed with 3 grams of water for 2 hours. After washing the crude ortho-phthalic acid filtered off from the hydrolysate, with acetone, there was obtained 64 grams of ortho-phthalic acid of 98.5% purity, corresponding to a molar yield of 56.3%.

*Example 2*

10 grams of terephthalic acid and 11.2 grams of orthophthalic acid was treated as in Example 1 and the residue was refluxed with 100 grams of ortho-dichlorbenzene at 130° C. On following the separation procedures described in Example 1 there was obtained: 10 grams of substantially 100% pure terephthalic acid, corresponding to substantially 100% molar yield; and 5.7 grams of orthophthalic acid of 98% purity corresponding to a 49.9% molar yield.

*Example 3*

10 grams of terephthalic acid and 11.2 grams of orthophthalic acid was treated as in Example 1 and the residue was refluxed with a mixture comprising 32 grams of orthodichlorbenzene and 8 grams of propionic acid.

On following the separation procedures described in Example 1 there were obtained: 9.9 grams of terephthalic acid of 99.6% purity, corresponding to a molar yield of 98.6%; and 6.3 grams of 98.4% pure ortho-phthalic acid, corresponding to a 55.3% molar yield.

Example 4

To a mixture having the composition terephthalic acid 30 grams, isophthalic acid 70 grams and ortho-phthalic acid 40 grams were added 300 grams of benzoic acid and 150 mls. of toluene, and the mixture was heated in an oil bath at 200° C. in an apparatus fitted with a Dean and Stark decanter and a reflux condenser. The removal of water from the mixture and of sublimed benzoic acid from the condenser was effected by retaining sufficient toluene in the system. When no more water was evolved the suspension was filtered through a sintered glass plate and a mixture of solid iso- and tere-phthalic acids was obtained. This precipitate was boiled with toluene, and on refiltration there was obtained 94 grams of mixed acids which was shown by infra-red spectroscopy to have the composition isophthalic:terephthalic:ortho-phthalic::68:31:1.

The filtrate comprising benzoic acid and ortho-phthalic anhydride was stirred under reflux with 27 grams of water for 2 hours, but no deposition of ortho-phthalic acid occurred. This benzoic acid was used to treat a further 150 grams of the starting carboxylic acid mixture. There was isolated in this way on the initial filtration 98 grams of iso- and tere-phthalic acids in the weight ratio 69:30 containing 1% by weight of benzoic acid. Hydrolysis of the benzoic acid filtrate as before, gave a precipitate of ortho-phthalic acid, which yielded after extraction 31 grams of 99% pure ortho-phthalic acid.

It was possible to continue this separation and purification procedure through several further cycles of operation using the same benzoic acid. The benzoic acid was recovered from the mother liquor by distillation.

Example 5

A mixture of benzoic acid (133 grams), ortho-phthalic acid (67 grams) and ortho-xylene (66 grams) was heated to 200° C. in an oil bath using a flask fitted with a Dean and Stark decanter and reflux condenser. During 2 hours 7.3 mls. of water was azeotroped away with ortho-xylene (6.6 grams) and then evolution of water ceased. The residue (250.4 grams), by analysis contained 24.4 weight percent of phthalic anhydride (theory 23.9 weight percent).

We claim:

1. A continuous process for separating ortho-phthalic acid from a mixture containing ortho-phthalic acid and at least one other phthalic acid which comprises continuously feeding the mixed phthalic acids and a solvent, selected from the class consisting of benzene nitrobenzene, chlorobenzene, alkylbenzene, chloroalkylbenzene, benzoic acid, alkyl benzoic acids, alkanoic acids, and dioxane, and mixtures thereof, to a dehydration zone, held at a temperature from 100° C. to 300° C., continuously removing water vapor from said zone, continuously withdrawing magma comprising mixed acids, phthalic anhydride and solvent from said zone, centrifuging said magma, isolating mixed iso- and terephthalic acid after said centrifuging and washing the same with said solvent, continuously passing the mother liquor and washings to a second zone held at a temperature from 100° C. to 300° C. together with sufficient water to hydrolyze the ortho-phthalic anhydride content thereof, precipitating the ortho-phthalic acid and continuously withdrawing and centrifuging the magma from said second zone, continuously separating the ortho-phthalic acid and washing the same with said solvent, continuously removing water from the mother liquor solvent, distilling the same, and then continuously recycling it to said dehydration zone.

2. A process for separating ortho-phthalic acid from a mixture containing ortho-phthalic acid and at least one other phthalic acid selected from the group consisting of isophthalic acid and terephthalic acid which comprises subjecting said mixture to dehydration conditions in the presence of a solvent selected from the class consisting of benzene, nitrobenzene, chlorobenzene, alkylbenzene, chloroalkylbenzene, benzoic acid, alkyl benzoic acids, alkanoic acids, and dioxane, and mixtures thereof, and at a temperature from 100° C. to 300° C., whereby ortho-phthalic anhydride is formed and dissolved in said solvent; removing insoluble isomeric acid compounds selected from the class consisting of iso- and terephthalic acids from the solution; subjecting the remaining solution to hydrolysis with at least a stoichiometric proportion of water, based on the phthalic anhydride content of said solution, at a temperature from about 100° C. to 300° C., whereby said ortho-phthalic anhydride in converted to ortho-phathalic acid; and finally separating the precipited ortho-phthalic acid from said solvent.

References Cited in the file of this patent

UNITED STATES PATENTS

| 1,301,388 | Conover et al. | Apr. 22, 1919 |
| 2,569,440 | Agnew et al. | Oct. 2, 1951 |
| 2,753,373 | Hutchings et al. | July 3, 1956 |

OTHER REFERENCES

Wagner et al: Synthetic Organic Chemistry, page 559 (1953).